(12) United States Patent
Miller et al.

(10) Patent No.: US 10,290,010 B2
(45) Date of Patent: *May 14, 2019

(54) METHODS FOR ORGANIZING, QUALIFYING, SCORING, MAPPING AND ANALYZING CULTURAL DATA

(71) Applicant: Roundhouse One LLC, San Francisco, CA (US)

(72) Inventors: Mark Raymond Miller, San Francisco, CA (US); Hadar Wissotzky, San Francisco, CA (US); Natan Goore, San Francisco, CA (US); Signo Uddenberg, San Francisco, CA (US); Christopher Damien, San Francisco, CA (US); Evelyn Fisher, San Francisco, CA (US)

(73) Assignee: Roundhouse One LLC, San Francisco, CA (US)

( * ) Notice: Subject to any disclaimer, the term of this patent is extended or adjusted under 35 U.S.C. 154(b) by 1318 days.

This patent is subject to a terminal disclaimer.

(21) Appl. No.: 14/310,785

(22) Filed: Jun. 20, 2014

(65) Prior Publication Data
US 2014/0372170 A1    Dec. 18, 2014

Related U.S. Application Data

(63) Continuation-in-part of application No. 13/586,520, filed on Aug. 15, 2012, now Pat. No. 10,147,053, and a continuation-in-part of application No. 14/053,927, filed on Oct. 15, 2013, now Pat. No. 9,996,807.

(60) Provisional application No. 61/974,035, filed on Apr. 2, 2014, provisional application No. 61/974,030, filed on Apr. 2, 2014.

(51) Int. Cl.
*G06Q 30/02* (2012.01)
*G06Q 10/00* (2012.01)

(52) U.S. Cl.
CPC ......... *G06Q 30/0201* (2013.01); *G06Q 10/00* (2013.01)

(58) Field of Classification Search
CPC .................................................. G06Q 30/02
See application file for complete search history.

(56) References Cited

U.S. PATENT DOCUMENTS

2014/0324395 A1* 10/2014 Silverman ............... G06N 5/04
703/1

* cited by examiner

*Primary Examiner* — Kurtis Gills
(74) *Attorney, Agent, or Firm* — Paul Davis

(57) ABSTRACT

A method is provided for quantification and mapping of cultural characteristics. Using an analytic engine, cultural attribute information is collected and organized by assigning binary scores to cultural tendencies. Using a cultural score engine coupled to the analytic engine, cultural attribute data is scored for each cultural attribute category to create scored data. Scored data is mapped to a graphic output using a map engine. Quantification of areas, organization priorities, or cultural tendencies associated with each graphic output is performed with an assessment engine. Comparing multiple cultures or scenarios affecting cultural attributes is executed by a comparison engine that compares multiple cultural graphic outputs in a single comparison graphic output of cultural tendencies.

21 Claims, 16 Drawing Sheets

METHODS FOR ORGANIZING, QUALIFYING, SCORING, MAPPING AND ANALYZING CULTURAL DATA

FIELD OF THE INVENTION

The invention relates generally to systems used to classify, quantify and visually represent information describing cultural attributes and characteristics, and more particularly to systems for classifying and scoring cultural attributes and characteristics.

DESCRIPTION OF RELATED ART

Currently, institutional and other leaders make management decisions with varying degrees of understanding of: 1) affect of culture, 2) affect on culture, or 3) understanding how culture influences the decisions they make. Even when companies choose to modify cultural aspects or management systems, there is little industry standardization related to measuring how these changes actually affect the organization's culture. When organizations choose to evaluate cultural considerations such as comparison to a benchmark, restructuring, or corporate governance and goals, evaluations lack statistical and other quantifiable means to evaluate cultural impacts. The impacts of these decisions often result in isolated, unrepeatable, or one-time efforts and offer no continuity or opportunity for further comparison. This minimizes the potential value of these decisions. This type of "data-light" decision making, can lead to operational inefficiency, wasted expenditure and missed revenue. One of the causes for this situation is the lack of a measurable and repeatable means of describing a culture and comparing this description to a variable situation.

No existing analytics engine scores and graphically represents cultural information to illustrate tendencies, assess current cultural states, set cultural goals and/or benchmark performance. Currently, there are few reliable services that can collect and score information relating to culture and generate graphic output based on this information. There is an even greater lack of services and standardization for a common format to quantify, score, and map cultural information across different cultures, methods, or variables for comparison. There is also a lack of services and standardization for quantitatively measuring and scoring cultural data. Optimal organization performance is dependent on many complex factors relating to various cultural attributes, and also cultural factors interrelated to or affected by environment, assets, other cultures, and time. The interaction and effect of these factors call for powerful methodologies and technology to provide insight and basis for action.

Accordingly, there exists a need for modern, reliable and repeatable technology and intelligence to provide improved measurement of cultural systems, including ability to measure, score, quantify, visually represent, and compare cultural information with adjustable priorities. There is a further need to use collection and scoring engines that can collect cultural information, including mobile device-supported survey data, and connect cultural data to databases and analytic engines, and to connect this quantified, scored culture data to analytic and mapping engines that provide systems and methods to graphically represent and compare cultural information.

SUMMARY OF THE INVENTION

An object of the present invention is to provide methods for organizing, qualifying, scoring, mapping, and analyzing cultural data.

Another object of the present invention is to provide methods for comparing scored cultural data or visual representations.

Another object of the present invention is to provide a means of scoring and qualifying cultural data collected using different methodologies, surveys, techniques, or otherwise varying in quality, collection method, or cultural data content.

These and other objects of the present invention are achieved in a method for quantification and mapping of cultural characteristics. Using an analytic engine cultural attribute information is collected and organized by applying a binary score and cultural tendency. A cultural attribute receives information by category. The cultural attribute data is scored for each cultural attribute to create scored data and executed by a cultural score engine coupled to the analytic engine that receives the scored data and maps the cultural attribute data to a graphic output and executed with a map engine. Quantification of areas, organization priorities, or cultural tendencies associated with each graphic output are performed with an assessment engine. Graphic outputs are compared into a single comparison graphic output of cultural tendencies and executed by a comparison engine.

DETAILED DESCRIPTION

Figure 1:
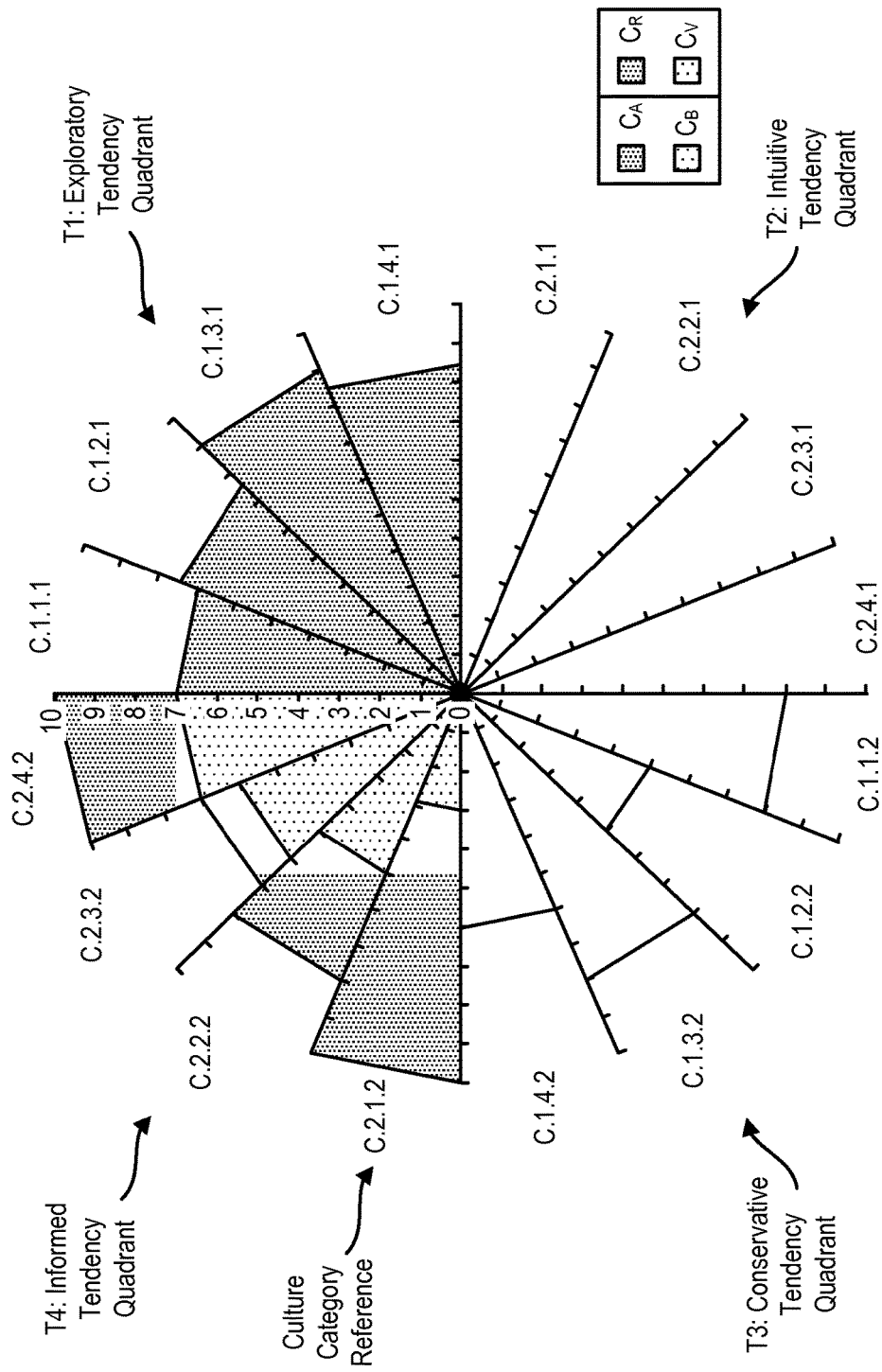
FIG. 1 illustrates one embodiment of a mapped output of the present invention where comparative scores create secondary culture plots. The embodiment shows culture ($C_A$) compared to another culture ($C_B$). Another interpretation of the embodiment shows reference culture ($C_R$) compared to cultural comparison variable ($C_V$).

As used herein, the term engine refers to software, firmware, hardware, or other component that can be used to effectuate a purpose. The engine will typically include software instructions that are stored in non-volatile memory (also referred to as secondary memory). When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein, the term database management system, "DMS," or "DBMS" is used broadly to refer to a database program. The program will typically include a software system that uses a standard method of cataloging, retrieving, and running queries on data. The DBMS is able to manage incoming data, organize is, and provide ways for the data to be modified or extracted by users or other programs.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving a wireless signal, decoding if needed, and exchanging information with a server to send and receive cultural information data including survey data. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the terms "social network" and "SNET" comprise a grouping or social structure of devices and/or individuals, as well as connections, links and interdependencies between such devices and/or individuals. Members or actors (including devices) within or affiliated with a SNET may be referred to herein as "nodes", "social devices", "SNET members", "SNET devices", "user devices" and/or "modules". In addition, the terms "SNET circle", "SNET group" and "SNET sub-circle" generally denote a social network that comprises social devices and, as contextually appropriate, human SNET members and personal area networks ("PANs").

A used herein, the term "wearable device" is anything that can be worn by an individual and that has a back side that in some embodiments contacts a user's skin and a face side. Examples of wearable device include but are not limited to a cap, arm band, wristband, garment, and the like. The term "wearable device" can also be a monitoring device if it includes monitoring elements.

As used herein, the term "computer" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "Internet" is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies. The Internet carries an extensive range of information resources and services, such as the inter-linked hypertext documents of the World Wide Web (WWW) and the infrastructure to support email. The communications infrastructure of the Internet consists of its hardware components and a system of software layers that control various aspects of the architecture.

As used herein, the term "extranet" is a computer network that allows controlled access from the outside. An extranet can be an extension of an organization's intranet that is extended to users outside the organization in isolation from all other Internet users. An extranet can be an intranet mapped onto the public Internet or some other transmission system not accessible to the general public, but managed by more than one company's administrator(s). Examples of extranet-style networks include but are not limited to:

LANs or WANs belonging to multiple organizations and interconnected and accessed using remote dial-up LANs or WANs belonging to multiple organizations and interconnected and accessed using dedicated lines Virtual private network (VPN) that is comprised of LANs or WANs belonging to multiple organizations, and that extends usage to remote users using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to:

A LAN

A Wide-area network (WAN) that is comprised of a LAN that extends usage to remote employees with dial-up access A WAN that is comprised of interconnected LANs using dedicated communication lines A Virtual private network (VPN) that is comprised of a LAN or WAN that extends usage to remote employees or networks using special "tunneling" software that creates a secure, usually encrypted connection over public lines, sometimes via an Internet Service Provider (ISP).

For purposes of the present invention, the Internet, extranets and intranets collectively are referred to as ("Network Systems").

As used herein, the term "attribute" is a definable characteristic describing a person, group, place, or thing and can include a quality, property, or other descriptor. An attribute is also a given symbol representing a definable characteristic for general or particular persons, groups, places or things, and the like.

As used herein, the term "Binary" means, existing of, indicating, or involving two metrics as measured in relation to each other. Each cultural category defines a culture in terms of two opposing conditions, Binary A and Binary B, which change for each given cultural category utilized for analysis. The distance between Binary A and Binary B may be measured through defined increments. Each binary can be designed to represent individual, identifiable behaviors and characteristics of the subject of analysis. A range of binary measures will represent the variety of identifiable behaviors of the subject of analysis.

As used herein, the term "culture" means, two or more people acting, or defining themselves, or being defined by others, as a definable unit and exhibiting common attributes, values, norms, characteristics, or behaviors. Culture can include an embodied and dynamic sum of values, norms, characteristics, and behaviors. Culture can be analyzed, studied, or exhibited in artifacts representative of two or more people. Culture can be analyzed, studied, or surveyed from the experiences or perceptions of two or more people. An individual, or group of individuals, may belong to numerous cultures that may have overlapping populations. These overlaps may be noted in comparative measures as a shared assignment, or, assigned to each culture distinctly with the person associated with both cultures.

As used herein, the term "a cultural tendency" means a tendency assigned to a culture to define or predict behaviors and actions of the culture.

A tendency is a quality that makes something likely to happen or that make a person or a group of people (culture) likely to think or behave in a particular way. A tendency can be a way of behaving, proceeding, planning, or taking action that is developing and becoming more common or taking action that can be generalized by or typified by a certain set of characteristics and patterns. A tendency can be a direction or approach toward decisions, another person or group, place, object, effect, or limit, a proneness to a particular kind of thought or action, the purposeful trend of something written or said, and/or a deliberate but direct advocacy. The basis of defining a tendency may be fixed or variable typology data, analysis of attributes, measured observation in response to a situation or variable, or other analytic methods. Cultural tendency is the tendency associated with or assigned to a culture.

As used herein, the term "exploratory tendency" means a tendency for a person or group to act or make a decision that is statistically or qualitatively associated with experimentation, leadership, or participation ahead of, or before, the average rate of taking action or making decisions. As with all cultural tendencies, the exploratory tendency is defined in comparison to a designated person or group in relation to the same condition, or the same person or group in relation to itself in response to a change in a define variable. For example, the person or culture may potentially, but not exclusively, exhibit the following characteristics or behaviors: high risk/high reward behavior patterns in both financial and asset decision-making, including portfolios, commercial lease considerations, and new technology purchases, adventurous activities, high travel rates, early technology adoption rates, high innovation rates, demographic heterogeneity, encouragement of individual activity rather than group activity, earlier participation in new financial investments or more risky financial portfolio, wide exploration and consideration of different ideas as part of decision-making, operations that require or are open to a more broad than average import of resources.

As used herein, the term "conservative tendency" means the tendency for a person or group to act or make a decision that is statistically, or qualitatively associated with behavior or leadership or participation that is more reserved or cautious or behind or less active, the average rate or an action or decision in comparison to other people or groups and/or itself. It is a cautious approach or slow participation in a variety of things, including but not limited to, new activities, low travel rates, later stage technology adoption rates, low innovation rates, demographic homogeneity, encouragement of group activity rather than individual activity, consensus-building or limited exploration and consideration of different ideas as part of decision-making, later participation rates in financial investment, conservative financial management, operations or other activities that prioritize or favor repeating past methods, conservative use of available resources, prioritizing saving or exporting resources and the like. As with all cultural tendencies, the conservative tendency is used in comparison to a designated person or group in relation to the same condition, or the same person or group in relation to itself in response to a change in a define variable.

As used herein, the term "informed tendency" means the tendency for a person or group to act or make a decision that is statistically, or, qualitatively associated with behavior or leadership or participation that is based upon the collection and evaluation of data or information related to the decision or action at a rate greater than or before the average rate of other persons or groups or itself—or—reliance on experience or thoughts or recollection of experiences or thoughts as a basis of decision at a rate less than the average rate of other persons or groups or itself. As a non-limiting example, the culture may potentially, but not exclusively, exhibit the following characteristics or behaviors: consideration of larger community input or decision making in a share or centralized way, reliance on statistical measures or other broad inputs before making financial decisions, seeks or utilizes research or information from multiple fact-oriented sources, higher-than-average rates or education prioritizes statistical accuracy, applies science-based findings to health and wellness. As with all cultural tendencies, the informed tendency is used in comparison to a designated person or group in relation to the same condition, or the same person or group in relation to itself in response to a change in a define variable.

As used herein, the term "intuitive tendency" means the tendency for a person or group to act or make a decision that is statistically, or, qualitatively associated with behavior or leadership or participation that is more spontaneous or based upon experience or thoughts or the recollection of experiences or thoughts at a rate greater than or before the average rate or other persons or groups or itself—or—collection and evaluation or data or information at a lower rate than, or after the average rate of other persons or groups or itself. As a non-limiting example, the culture may potentially, but not exclusively, exhibit the following characteristics or behaviors: consideration of larger community input or decision making in a share or centralized way, reliance on statistical measures or other broad inputs before making financial decisions, seeks or utilizes research or information from multiple fact-oriented sources, prioritizes statistical accuracy over wisdom or opinion, applies science-based findings to health and wellness more-than or traditional medicine less-than the average rate, and the like. As a non-limiting example, the person or group may potentially, but not exclusively, exhibit the following characteristics or behaviors: culture manages itself in a highly decentralized way, financial decisions or portfolio is based upon qualitative judgment rather than statistical models, lack of consideration or access to research, news other information from multiple fact-oriented sources, lower than average rates or education, prioritizes wisdom or opinion over statistical accuracy, applies traditional medicine more-than, or applies science-based findings less-than the average to health and wellness based decisions. As with all cultural tendencies, the intuitive tendency is used in comparison to a designated person or group in relation to the same condition, or the same person or group in relation to itself in response to a change in a define variable.

As used herein, the term "cultural tendencies plot" is a graphic presentation representing cultural attributes and cultural tendencies. The plot is a measurable, scalable, repeatable grid with equal and devisable quadrants with each quadrant representing a cultural decision tendency. When culture categories are scored for a given subject, binary scores correspond to cultural tendencies when plotted on the grid. As a non-limiting example of this a grid is a Cartesian Plot although any grid, or equivalent plot, that is measurable with equal and devisable quadrants.

As used herein, the term "data" means Facts and statistics collected for reference or analysis. Data may be collected in a fixed window of time related to study boundaries or it may be collected from ongoing monitoring. Culture data can take many forms and may not always be easily quantified; analysts are trained to qualify data. Data includes factual information (as measurements or statistics) used as a basis for reasoning, discussion, or calculation.

As used herein, the term "decision priorities" means a choice that one makes about something after thinking about it, analyzing it, and the like. It is the results of deciding. It is also the ability to make choices, the particular end of a discussion, a determination arrived at after consideration, and the like. It can include the variety of values that have influence on a person, group or culture's decision-making process, and the relative degree of influence of those values on a given culture's decision-making. Decision priorities can be communicated by a culture's representatives and/or exhibited in their attributes.

As used herein, the term "dimension" means the amount, number, or categorical type of things that something affects or influences. A dimension can be made up of the sum of attributes, categories, and divisions that collectively distinguish one individual realm of analysis from another individual realm of analysis, i.e. culture as opposed to natural resources or physical assets.

As used herein, the term "division" means the act or process of dividing, the state of being divided; the act, process, or an instance of distributing among a number, such as a distribution; one of the parts or groupings into which a whole is divided or is divisible. It can be the condition or an instance of being divided in opinion or interest. As a non-limiting example, in the context of cultural information and data, division is one of two components comprising the culture dimension and hierarchically determining the organization of culture data components. There can be four categories per division.

As used herein, the term "fixed typology data" means the study of, analysis, or classification based on types or categories. Fixed typology data is organizational information that is relatively fixed, offering primary organizational characteristics (i.e. demographics, location, affiliations, and other quantities, including enrollments, number of employees, number of offices, etc.) that are the foundation for a given cultural mapping. Fixed typology data can often be expressed in terms of static or semi-static characteristics that can be researched by or presented to a third party.

As used herein, the term "quadrant" means one part of an area, object, or graphic representation that is evenly divided into four parts; especially geometry: one part of a circle that is evenly divided into four sections. In cultural mapping applications, a quadrant is one of four sections comprising a grid, each quadrant representing a cultural tendency that is informed by several cultural categories and attributes. These sections may be divided into sub sections so that there may be more than four sections provided the original four sections geometry remains accurate.

As used herein, the term "radial location" means the rotational location of a point as measured along the relative position along the circumference of a circle. The location may be measured in polar coordinates of equal degrees from 0 degrees to 360 degrees—or—may be measured as a unit measure of the circumference related to the scale and length of the circumference. This can be applied to the cultural grid map, relating the radial position of the culture category binary score to a mapped location within a tendency quadrant. As a non-limiting example, a financial binary score that is measured as having a Conservative Tendency, can have a radial location closer to Exploratory Tendency than the Conservative Tendency if this decision tendency also score a greater-than-average reliance on experience rather than new research. If there was no, or an equal balance between Exploratory Tendency and Reserved Tendency than the position of the radial would be equidistant from these two tendencies. The radial location is the relative positioning that maps these relationships.

As used herein, the term "radial grid location algorithm" means an equation that describes the radial location of a given cultural category related to a grid map. As a non-limiting example it can be the polar coordinates measured in degrees associated with the Cartesian quadrant coordinates of "X" and "Y".

As used herein, the term "scale" means the level of measurement, investigation, analysis, or detail in a study, summary, or representation. Scale is assigned according to an accurate or relative means of measurement to relate an actual condition to a representative condition. As a non-limiting example, it can be the use of an "architectural ruler" where 1:1 scale is a representation of a scale at the same or equal size of the actual element related to imperial system of measures to that 1'=16" (often noted as $\frac{1}{16}^{th}$ scale) scale relates a representation that relates 1 foot to 16 inches for an actual ratio of 192 times smaller than the original. Another example is an engineering scale which uses even decimal ratios such as 1:10, 1:50, 1:100, etc. that represent direct ratios so that 1:100 indicates that the represented item is 100 times smaller than the actual measured item. Another example is a metric scale that relates to metric measurement systems. Scale may also refer to the level of detail in a study in a relational and representational way. As a non-limiting example, using architectural scale units may be ½ scale and can represent a close-up, high-detailed representation or study of the detail of a physical item such as a chair or table corner, while a $\frac{1}{64}$ scale is a broader focus, less-detailed representation or study of the item of focus and may be associated with a collection of buildings on an individual site. An example using an engineering scale is 4:1 uses the representation to increase the size of the detail of an item, 1:2 represents only a small decrease in the representation of an object while 1:1000 may be used to refer to information collected at the scale of an individual site or neighborhood.

As used herein, the term "sub-attribute" means a type of attribute that provides an increase level of detailed information related to a more general attribute. A group of sub-attributes related to a singular attribute may provide a more granular description of that attribute. Accurate sub-attribute information may increase the accuracy of the description or score of the more general attribute that it is associated.

As used herein, the term "time" refers to occasion, intervals, frequencies, and durations associated with information. Time, may be associated to data collection, period of analyses, measures of model projections.

As used herein, the term "value" means a measurement of the relative importance, quantity, impact or prioritization among different factors, conditions, decisions or units of commercial exchange. As a non-limiting example, a financial value uses monetary units such as currency to define value and may include First Cost, Life-Cycle Cost, Total Cost of Ownership, Cost Avoidance, Operational Cost or Capital Cost. Examples of non-financial values include the value measurement of health, education, family, or other group cohesion, environmental sustainability, stability, and communication types.

As used herein, the term "variable response data" means typology information that may change in response to a defined or unknown input. Variable response data can be information or measurements that are more sensitive to time, cycle, individuality, or other influencing factors more than fixed typology data.

Figure 2:
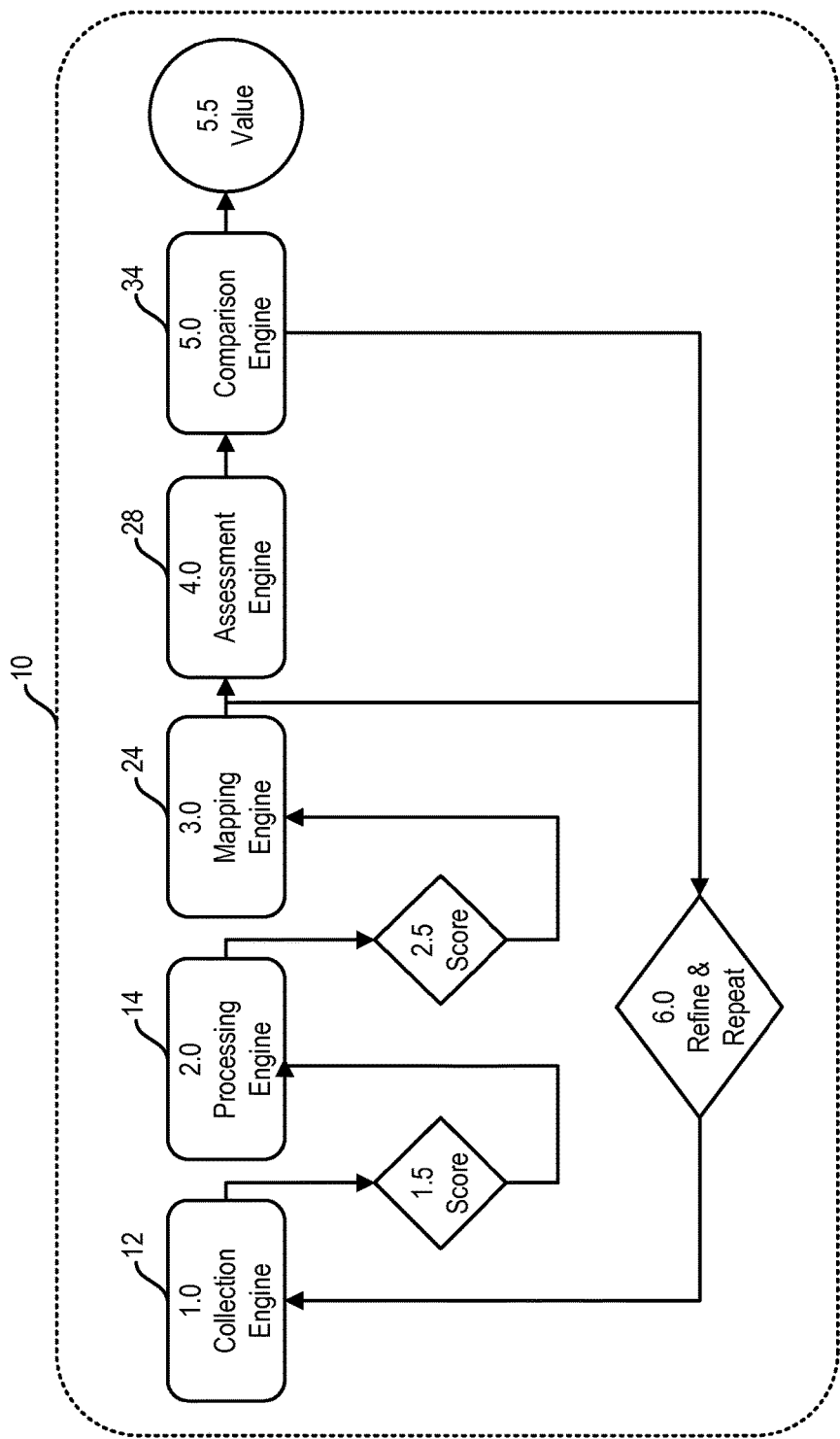
FIG. 2 is an overall system diagram of one embodiment of a system that provides quantification of an organization's quantification and mapping of cultural characteristics.

In one embodiment of the present invention, a system 10, and its associated methods, provide quantification of an organization's quantification and mapping of cultural characteristics. In one embodiment of the outputs of the present invention, the system 10 can map one culture in comparison to another culture by using comparative scores to create secondary culture plots, as illustrated in FIG. 1. An overall system 10 diagram is illustrated in FIG. 2.

Figure 3:
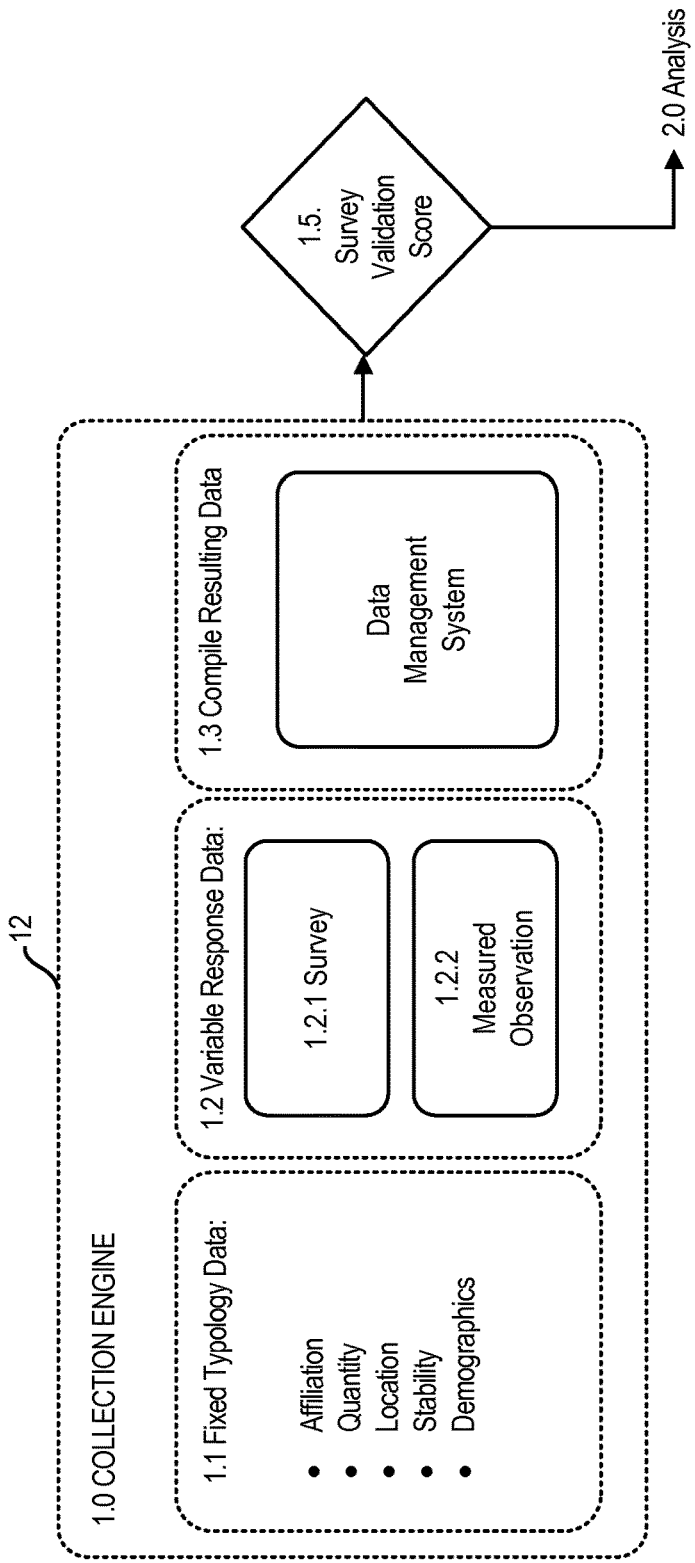
FIG. 3 illustrates one embodiment of a collection engine 12 that can be used with the present invention that collects, compiles and scores cultural data.

A collection engine 12, FIG. 3, is configured to collect and compile cultural data. Cultural data types include fixed typology data and variable response data. The cultural data can be collected using a survey method or a measured observation method. Survey method data can be collected using an engine (software, firmware, hardware, or other component used to effectuate cultural data collection), a social network, a mobile device, or a wearable device. Measured observation method data can be collected using researcher noted observations input into a Computer processor or mobile device.

As illustrated in FIG. 3, the cultural data collected can be linked to a database management system. The data management system can compile and process the data. The data management system can be a data processor linked via internet to the data input source used for data collection.

As illustrated in FIG. 3, the database management system can calculate a cultural data validation score. In one embodiment, the cultural data validation score can be a survey validation score. The cultural data validation score can be a calculated coefficient for completeness of data, device collection method, device calibration rating, or a combined coefficient calculated from multiple coefficients.

Figure 4:
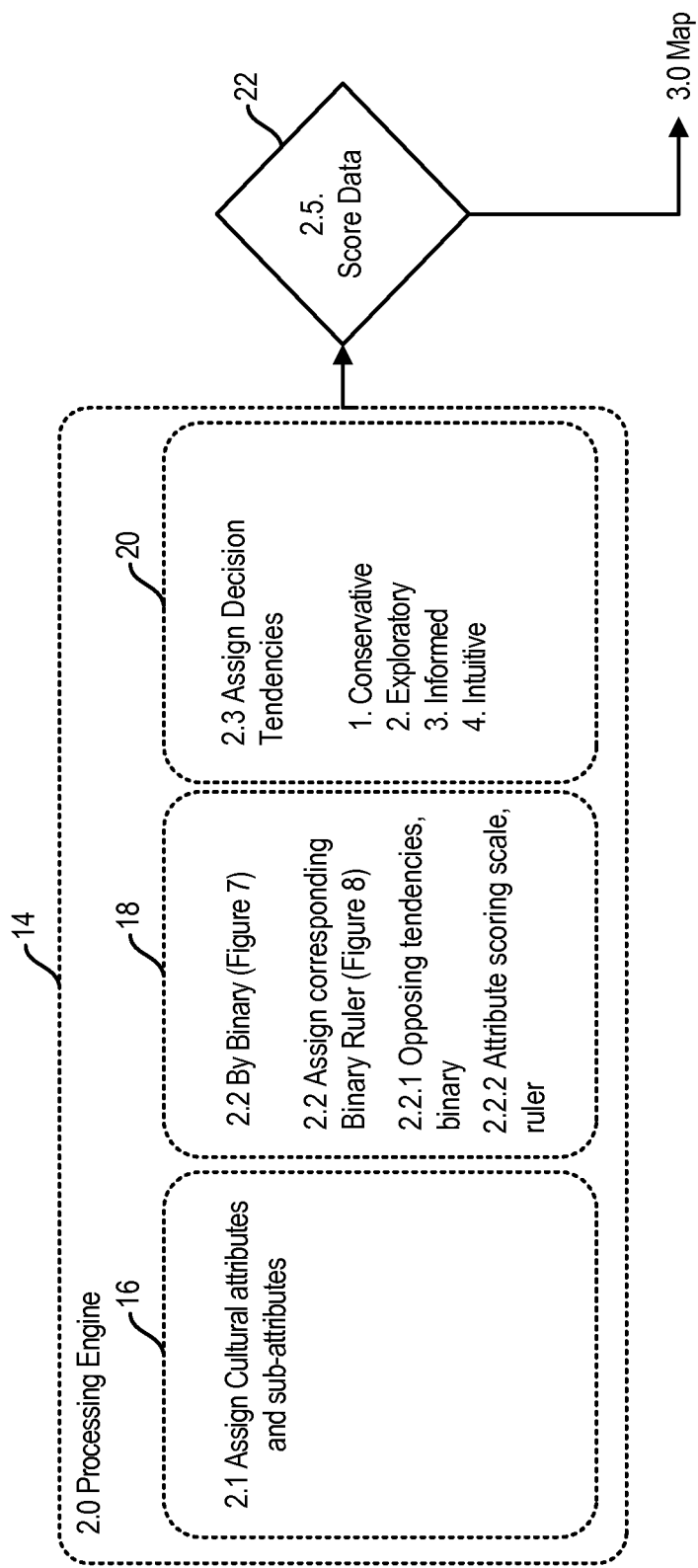
FIG. 4 illustrates one embodiment of a processing engine that can be used with the present invention that assigns cultural attributes and sub-attributes, assigns a corresponding binary ruler, assigns decision tendencies, and scores data.

A processing engine 14, FIG. 4, is configured to collect and organize cultural attribute information 16 by binary score 18 and by cultural tendency 20. A cultural score operation 22 is performed and coupled to or included in the processing engine 14 or other engines. The processing engine 14 or other engineers can be executed using an engine hosted on a Computer, a mobile device, or a wearable device. The cultural score operation 22 receives cultural attribute information 16 by category 15 and scores the cultural attribute information 16 for each cultural attribute 16 to create scored data 22.

The processing engine 14 can assign metadata tags based on cultural attribute information 16 and cultural tendency 20. Metadata tags can be input into a computer processor and mobile devices which are linked to the database.

Figure 5:
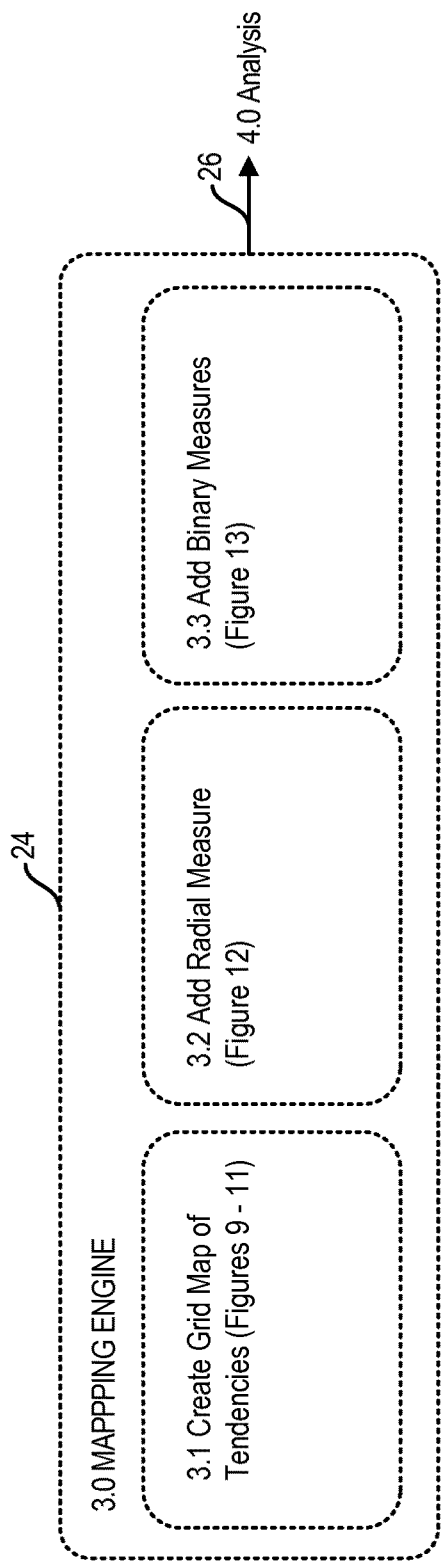
FIG. 5 illustrates one embodiment of a mapping engine 24 that can be used with the present invention that creates a grid map, adds a radial measure to the grid, and adds binary measures to the grid.

A map engine 24, FIG. 5, receives the scored data 22 and maps the cultural attribute information 16 to a graphic output 26, as more fully described hereafter.

Figure 6:
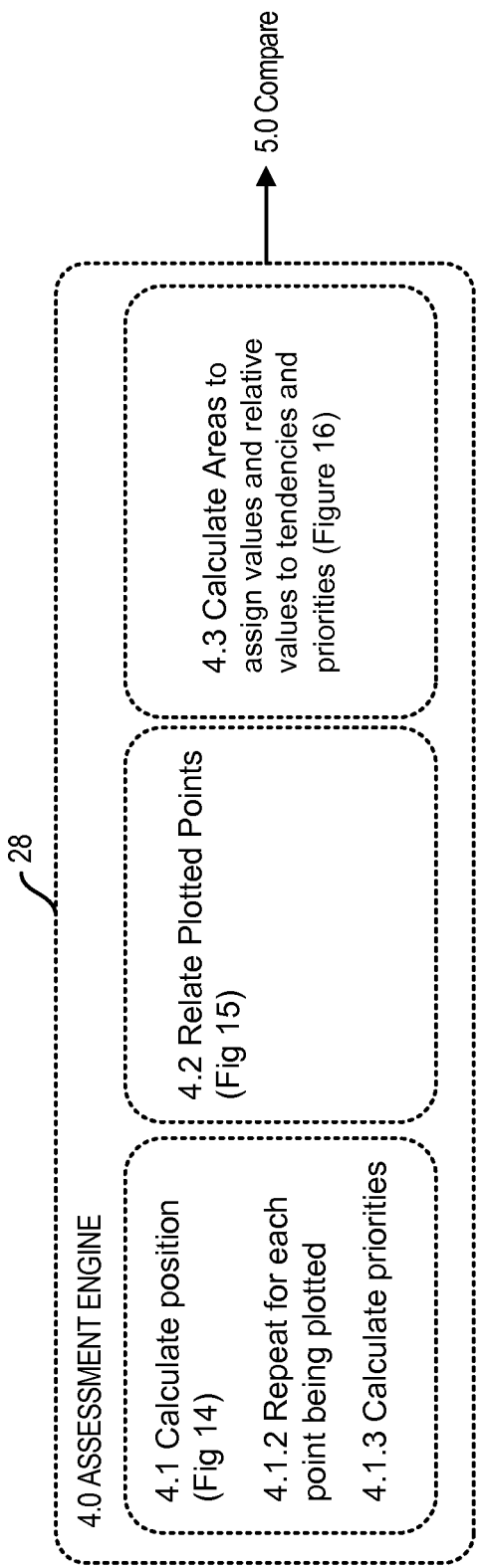
FIG. 6 illustrates one embodiment of an assessment engine 28 that can be used with the present invention that calculates scored data positions, relates plotted points, and calculates areas.
Figure 7:
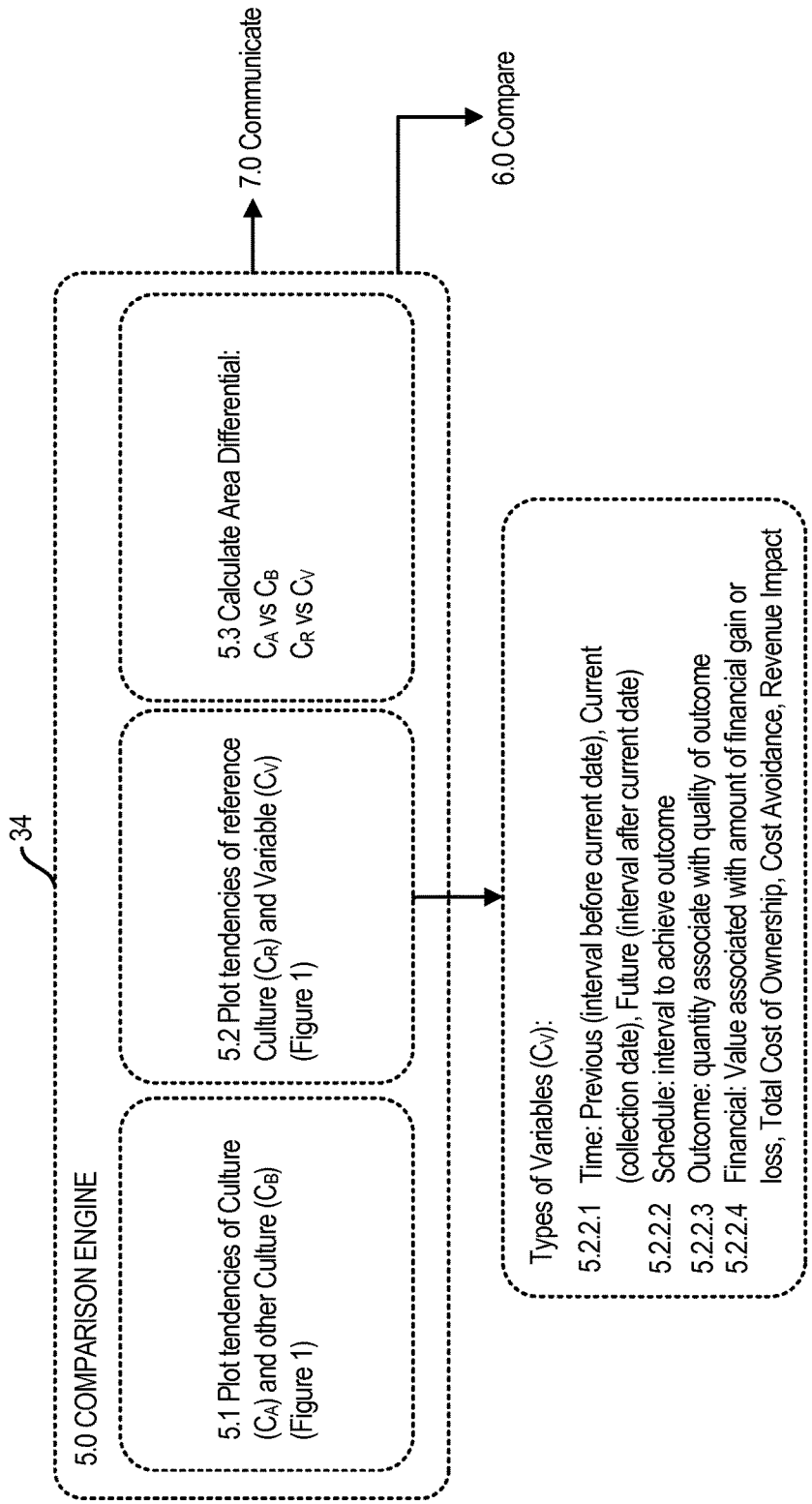
FIG. 7 illustrates one embodiment of a comparison engine that can be used with the present invention that plots tendencies of cultures being compared and calculates an area differential between compared outputs.

As illustrated in FIG. 6, an assessment engine 28 quantifies areas 30 and organization priorities 32 associated with each graphic output 26. A comparison engine 34, FIG. 7, compares a plurality of graphic outputs 26 into a single comparison graphic output 26 of cultural attributes 16.

The processing engine 14 generates one or more culture describing attributes 16 from the cultural attribute information 16 and assigns data scores to the cultural attribute information 16. This creates assigned data by category 15. In one embodiment, the assignment of data by category 15 is selected by at least one of, an attribute 16, by binary and by cultural tendencies 20.

In one embodiment, the graphic output 26 is a mapped output 26.

In one embodiment, the comparison engine 34 calculates quantifiable allocations by using a comparison of the assessed cultural attributes 16 to other cultures. In one embodiment, each attribute 16 includes a selection of sub-attributes selected from at least one of, diversity, social structure, environmental wellness, human wellness, management, financial, decision method and technology adeptness, as more fully described in Table 1.

TABLE 1

| Code | Culture Category | Code | Attribute Title Example |
|---|---|---|---|
| C.1.1 | DIVERSITY | C.1.1.1 | # OF RECEIVERS |
| | | C.1.1.2 | RETENTION RATE |
| | | C.1.1.3 | AGE (AVG) |
| | | C.1.1.4 | GENDER (AVG) |
| | | C.1.1.5 | RACE (AVG) |
| | | C.1.1.6 | # OF PROVIDERS |
| | | C.1.1.7 | AVG TENURE LENGTH |
| | | C.1.1.8 | # OF SUPPORT |
| C.1.2 | SOCIAL STRUCTURE | C.1.2.1 | PROVIDER/RECEIVER RATIO |
| | | C.1.2.2 | DIVISIONS (Organizational Structure) |
| | | C.1.2.3 | AVG (Working Group) SIZE |
| | | C.1.2.4 | FUNCTIONAL GROUPS |
| | | C.1.2.5 | SERVICE STYLE |
| | | C.1.2.6 | |

TABLE 1-continued

| Code | Culture Category | Code | Attribute Title Example |
|---|---|---|---|
| | | C.1.2.7 | |
| | | C.1.2.8 | |
| C.1.3 | ENVIRONMENTAL WELLNESS | C.1.3.1 | AVG MILES TO SOURCE OF TRAINING |
| | | C.1.3.2 | AVG MILES TO FOOD RESOURCE |
| | | C.1.3.3 | AVG MILES OF COMMUTE |
| | | C.1.3.4 | TECHNOLOGY IMPORT/EXPORT |
| | | C.1.3.5 | |
| | | C.1.3.6 | |
| | | C.1.3.7 | |
| | | C.1.3.8 | |
| C.1.4 | HUMAN WELLNESS | C.1.4.1 | AVERAGE ABSENCES PER RECEIVER |
| | | C.1.4.2 | HEALTH EVALUATIONS |
| | | C.1.4.3 | AVERAGE ABSENCES PER PROVIDER |
| | | C.1.4.4 | AVERAGE ABSENCES PER SUPPORT |
| | | C.1.4.5 | |
| | | C.1.4.6 | |
| | | C.1.4.7 | |
| | | C.1.4.8 | |
| C.2.1 | MANAGEMENT | C.2.1.1 | LEADER |
| | | C.2.1.2 | SPECIALTY |
| | | C.2.1.3 | # ON ORGANIZATIONAL BODY |
| | | C.2.1.4 | OPERATING HOURS |
| | | C.2.1.5 | MAJOR SUBDIVISION 1 OP HOURS |
| | | C.2.1.6 | MAJOR SUBDIVISION 2 OP HOURS |
| | | C.2.1.7 | |
| | | C.2.1.8 | |
| C.2.2 | FINANCIAL | C.2.2.1 | OPERATING EXPENSES |
| | | C.2.2.2 | GROSS REVENUE |
| | | C.2.2.3 | NET REVENUE |
| | | C.2.2.4 | TUITION |
| | | C.2.2.5 | % FINANCING OR ASSISTANCE |
| | | C.2.2.6 | CREDIT |
| | | C.2.2.7 | CHARITY CARE |
| | | C.2.2.8 | |
| C.2.3 | DECISION METHOD | C.2.3.1 | DATA USE |
| | | C.2.3.2 | PROBLEM SOVLING METHOD |
| | | C.2.3.3 | |
| | | C.2.3.4 | |
| | | C.2.3.5 | |
| | | C.2.3.6 | |
| | | C.2.3.7 | |
| | | C.2.3.8 | |
| C.2.4 | TECHNOLOGY ADEPTNESS | C.2.4.1 | DIGITAL TECHNOLOGY ADEPTNESS |
| | | C.2.4.2 | ANALOG TECHNOLOGY ADEPTNESS |
| | | C.2.4.3 | |
| | | C.2.4.4 | |
| | | C.2.4.5 | |
| | | C.2.4.6 | |
| | | C.2.4.7 | |
| | | C.2.4.8 | |

Figure 8:
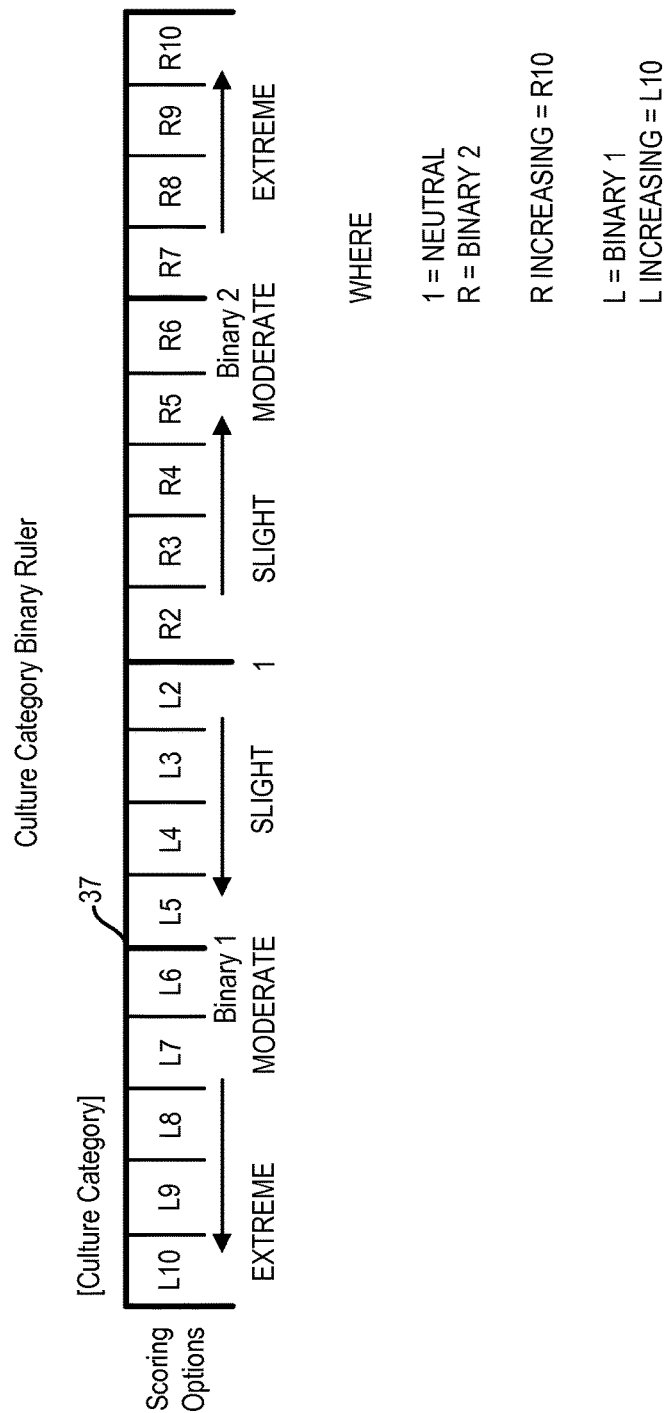
FIG. 8 illustrates one embodiment of a binary ruler that can be used with the present invention.

In one embodiment, for a binary score 18, each attribute 16 is given a corresponding unique binary ruler 37 with opposing tendencies 20 for each attribute 16, FIG. 8.

In one embodiment, for a binary score 18, each attribute 16 is scored on a scale. As a non-limiting example, the scale can be from −10 to +10, with an ability to measure decimal increments. As a non-limiting example, the score 22 on a scale of −10 to 10 can be 7.2.

In one embodiment, cultural tendencies 20 include at least one of: conservative, exploratory, informed, intuitive. Each tendency 20 represents a way of behaving, proceeding, planning, or taking action. How cultural attributes 16 relate to the cultural tendencies 20 is informed by cultural intelligence and processed in the map engine 24.

Conservative tendency 20 is typified by a person or group to act or make a decision that is statistically, or qualitatively associated with behavior or leadership or participation that is more reserved, cautious, behind, or less active than the average rate or an action or decision in comparison to other people or groups and/or itself.

Exploratory tendency 20 is typified by a person or group that acts or makes decisions in a way that is statistically or qualitatively associated with experimentation, leadership, or participation ahead of, or before, the average rate of taking action or making decisions.

Informed tendency 20 is typified by a person or group to act or make a decision that is statistically, or, qualitatively associated with behavior or leadership or participation that is based upon the collection and evaluation of data or information related to the decision or action at a rate greater than or before the average rate of other persons or groups or itself—or—reliance on experience or thoughts or recollection of experiences or thoughts as a basis of decision at a rate less than the average rate of other persons or groups or itself.

Intuitive tendency 20 is typified by a person or group to act or make a decision that is statistically, or, qualitatively associated with behavior or leadership or participation that is more spontaneous or based upon experience or thoughts or the recollection of experiences or thoughts at a rate greater than or before the average rate or other persons or groups or itself—or—collection and evaluation or data or information at a lower rate than, or after the average rate of other persons or groups or itself.

Figure 9:
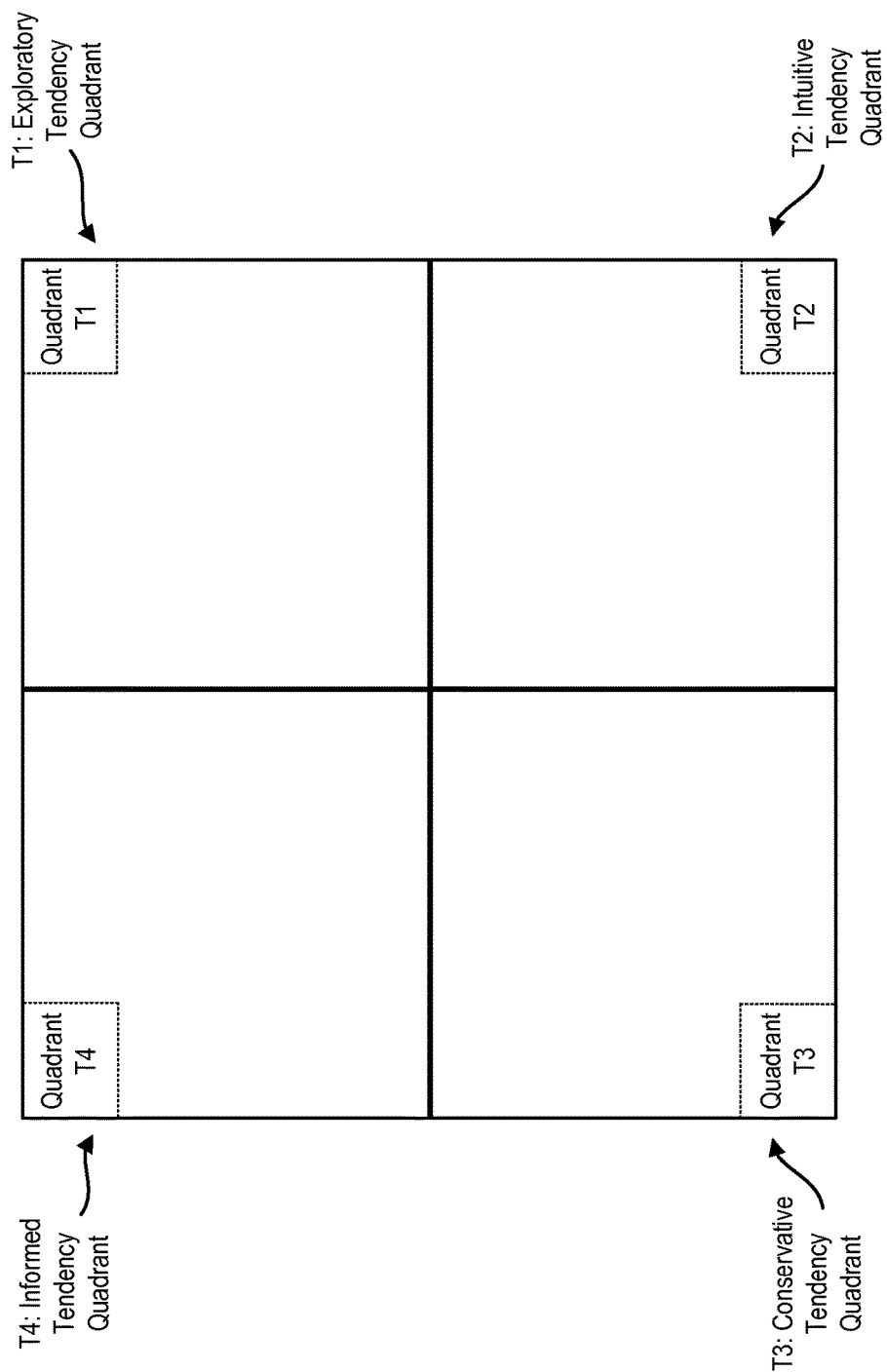
FIG. 9 illustrates a grid map with four quadrants.

FIG. 9 illustrates a grid map with four quadrants.

Figure 10:
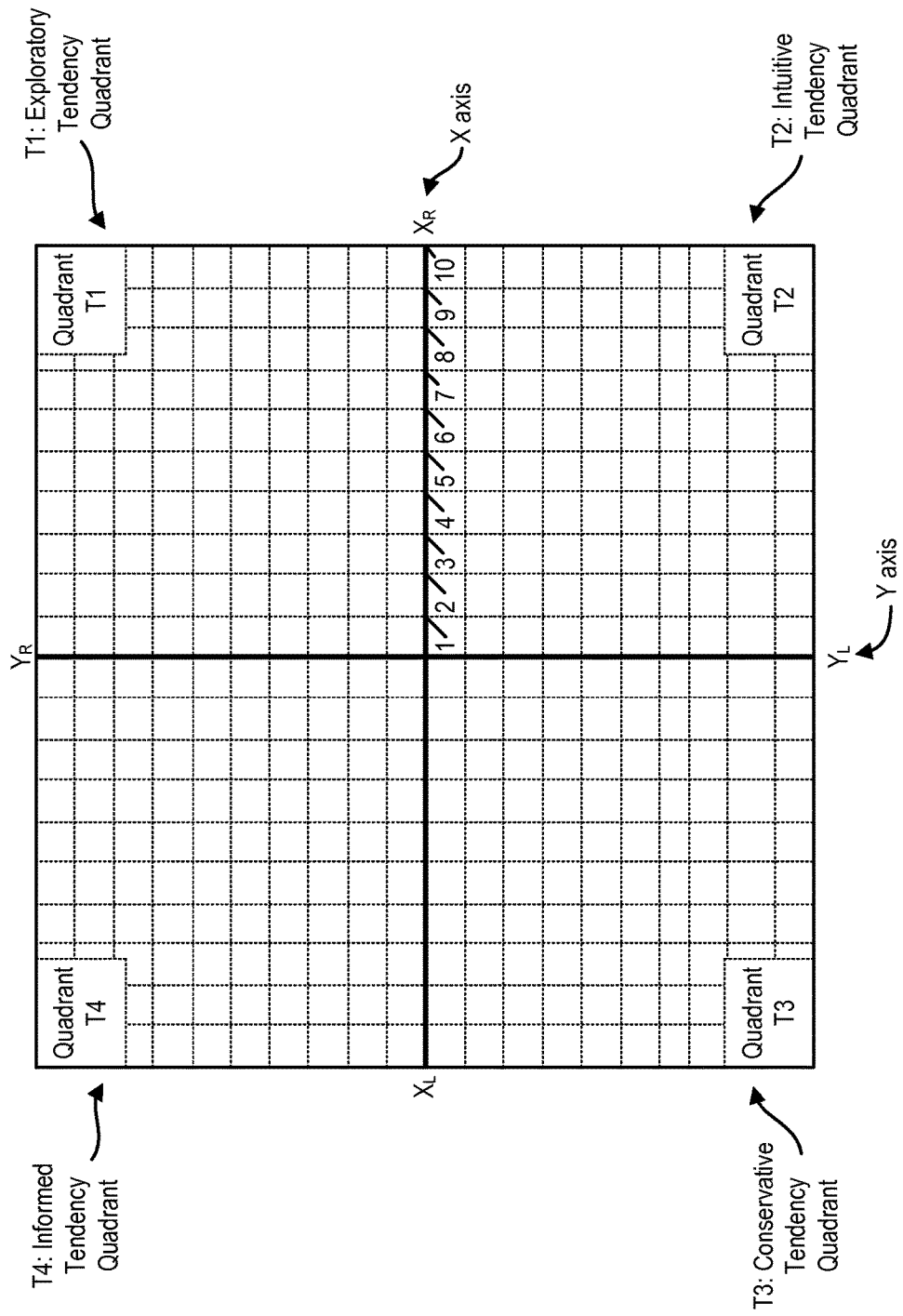
FIG. 10 illustrates a grid map with a rational tendency quadrant, an exploratory tendency quadrant, an intuitive tendency quadrant and a conservative tendency quadrant.

FIG. 10 illustrates a grid map with a rational tendency quadrant, an exploratory tendency quadrant, an intuitive tendency quadrant and a conservative tendency quadrant.

Figure 11:
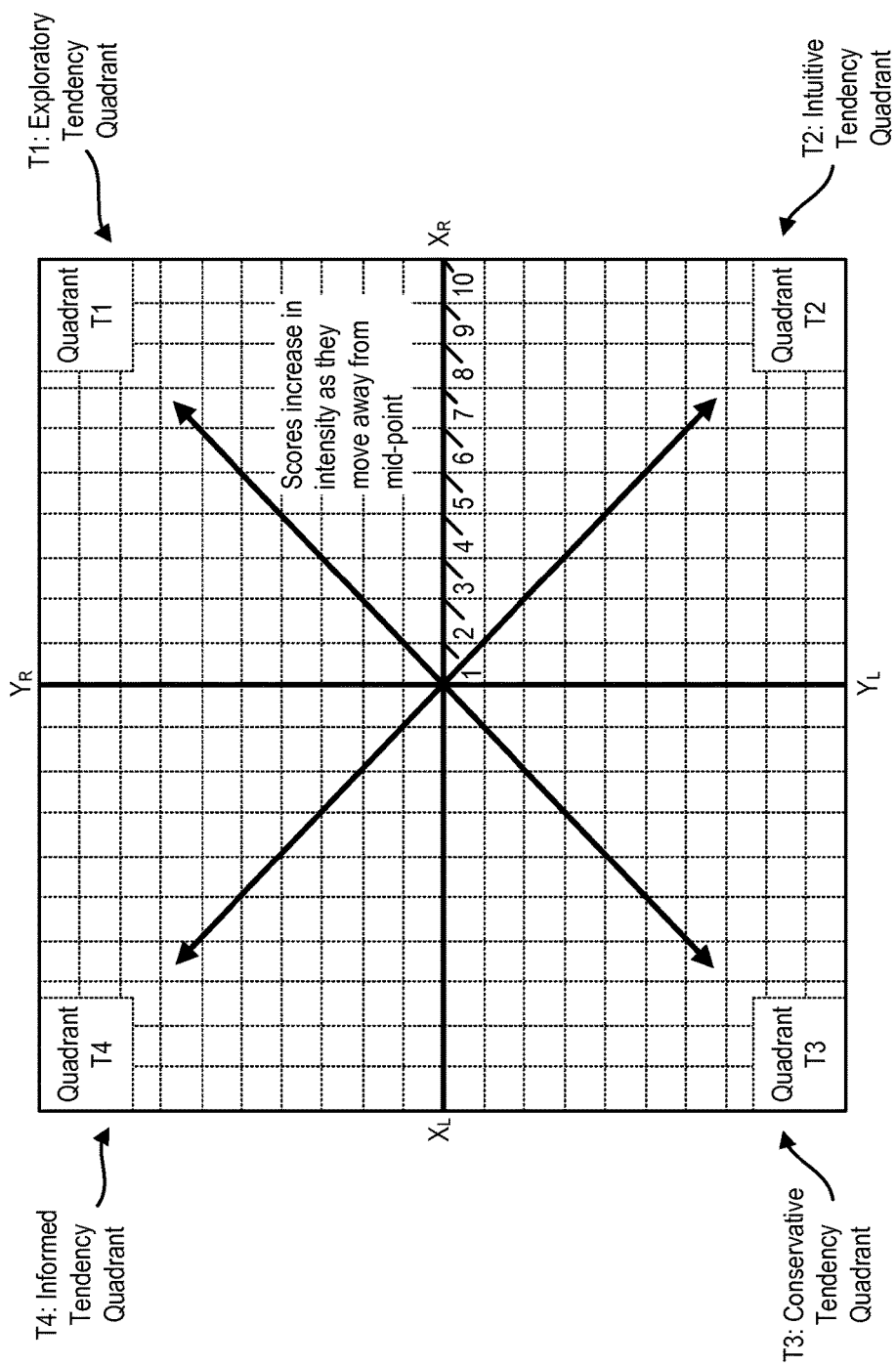
FIG. 11 illustrates mapping of quadrant intensity in a grid map.

FIG. 11 illustrates mapping of quadrant intensity in a grid map.

Figure 12:
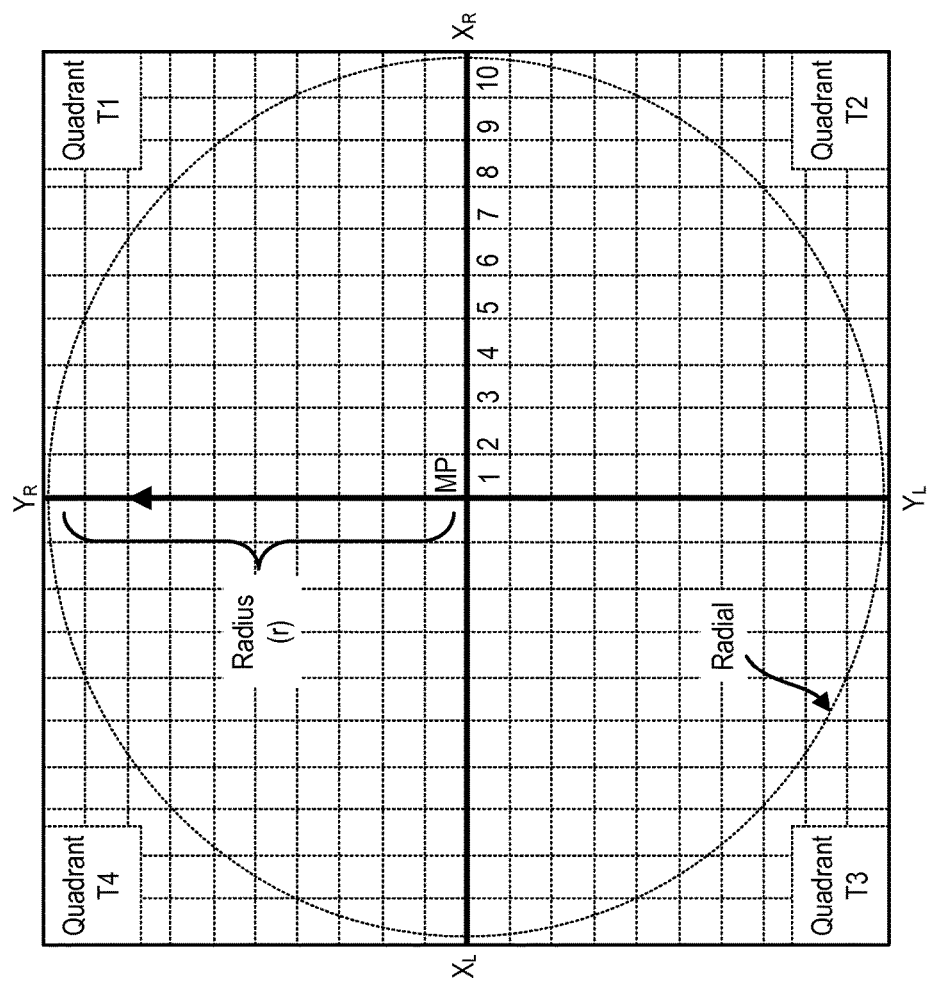
FIG. 12 illustrates a radial measure in a map.

FIG. 12 illustrates a radial measure in a map.

Figure 13:
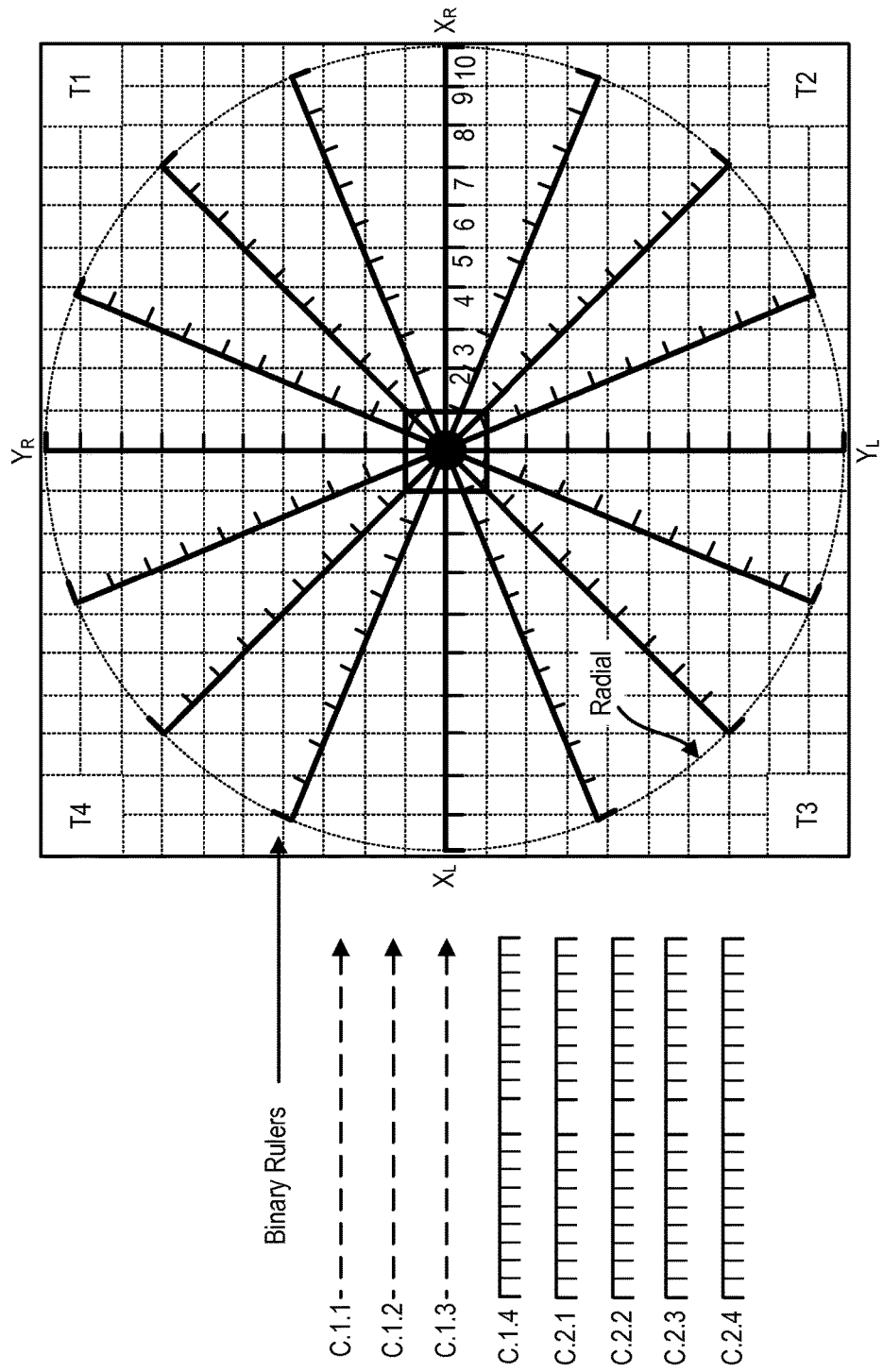
FIG. 13 illustrates binary rulers placed in a radial configuration over a grid map.

FIG. 13 illustrates binary rulers placed in a radial configuration over a grid map.

Figure 14:
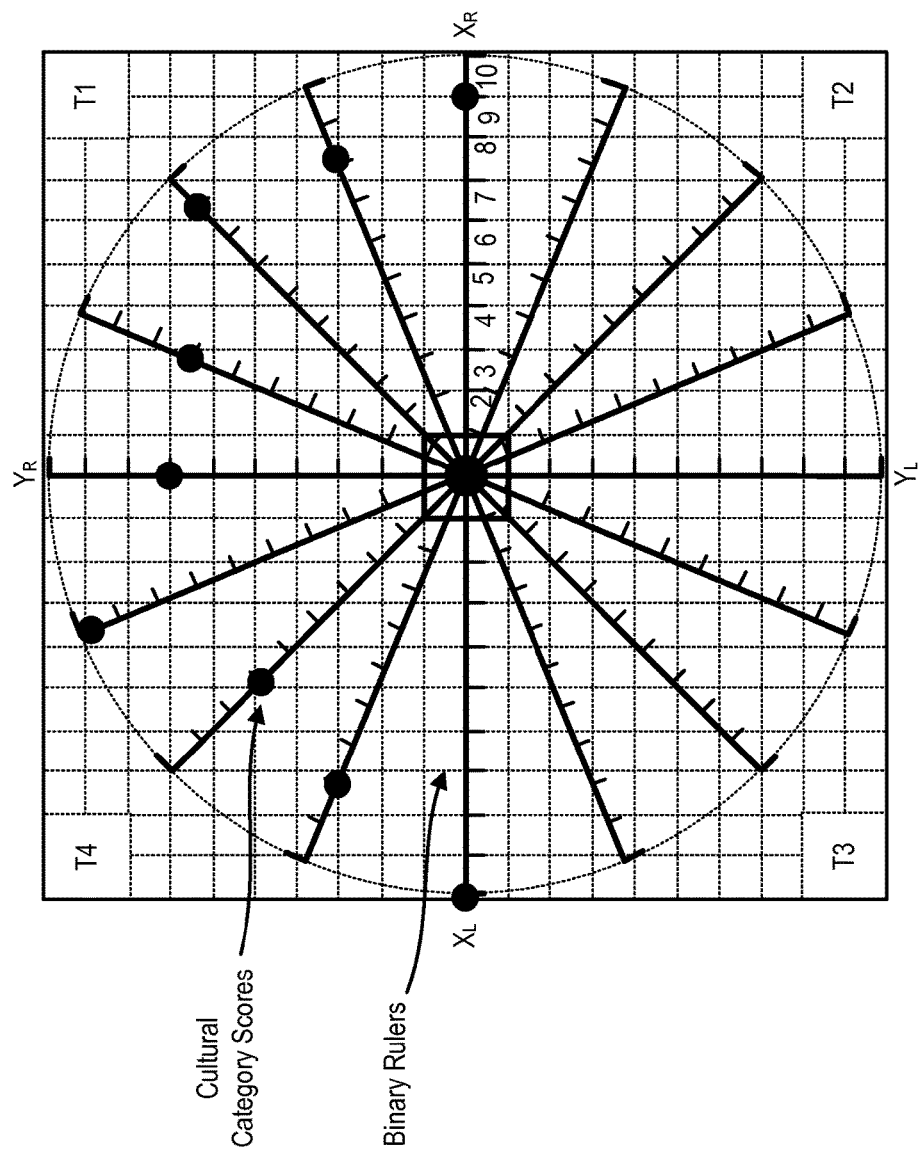
FIG. 14 illustrates a scored ruler in a radial formation.

FIG. 14 illustrates a scored ruler in a radial formation.

Figure 15:
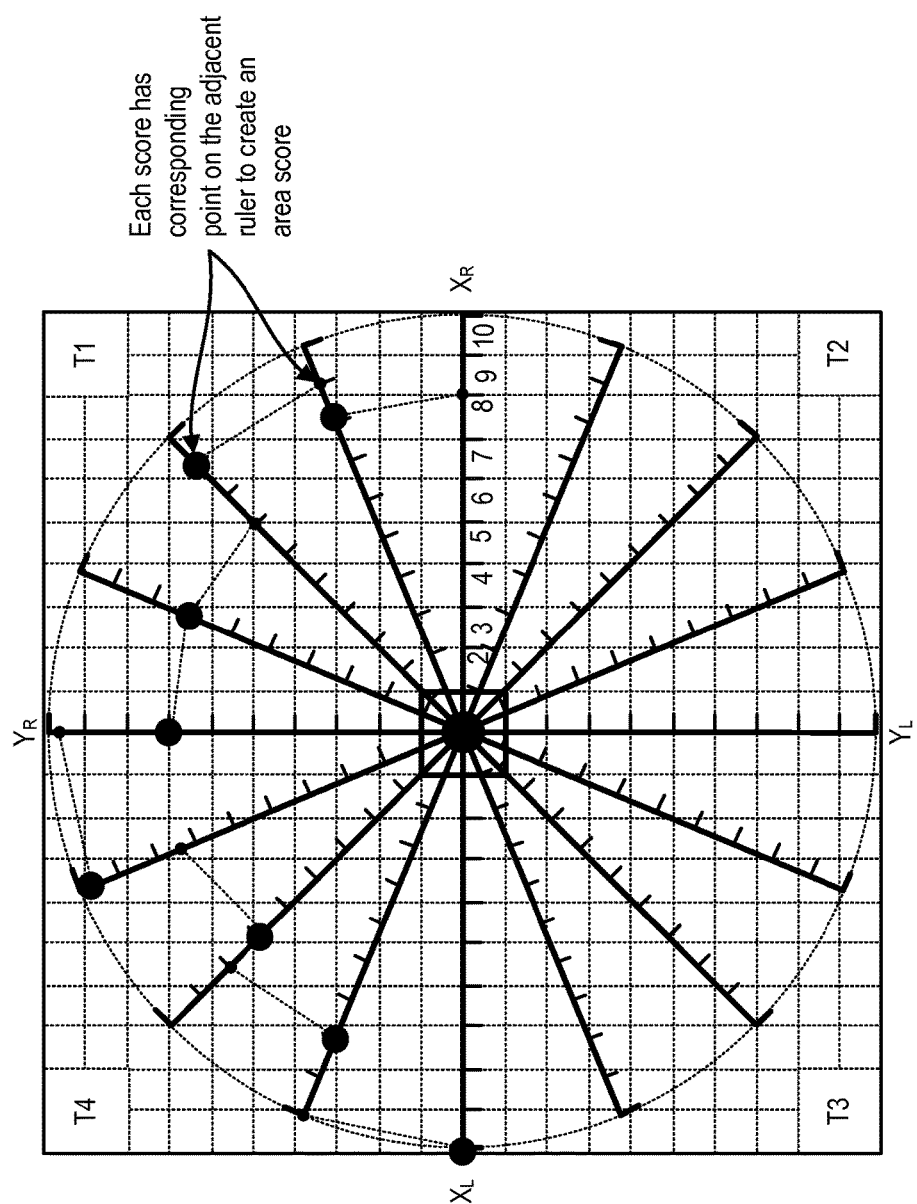
FIG. 15 illustrates that points on a radiation formation on a map can be connected.

FIG. 15 illustrates that points on a radiation formation on a map can be connected.

Figure 16:
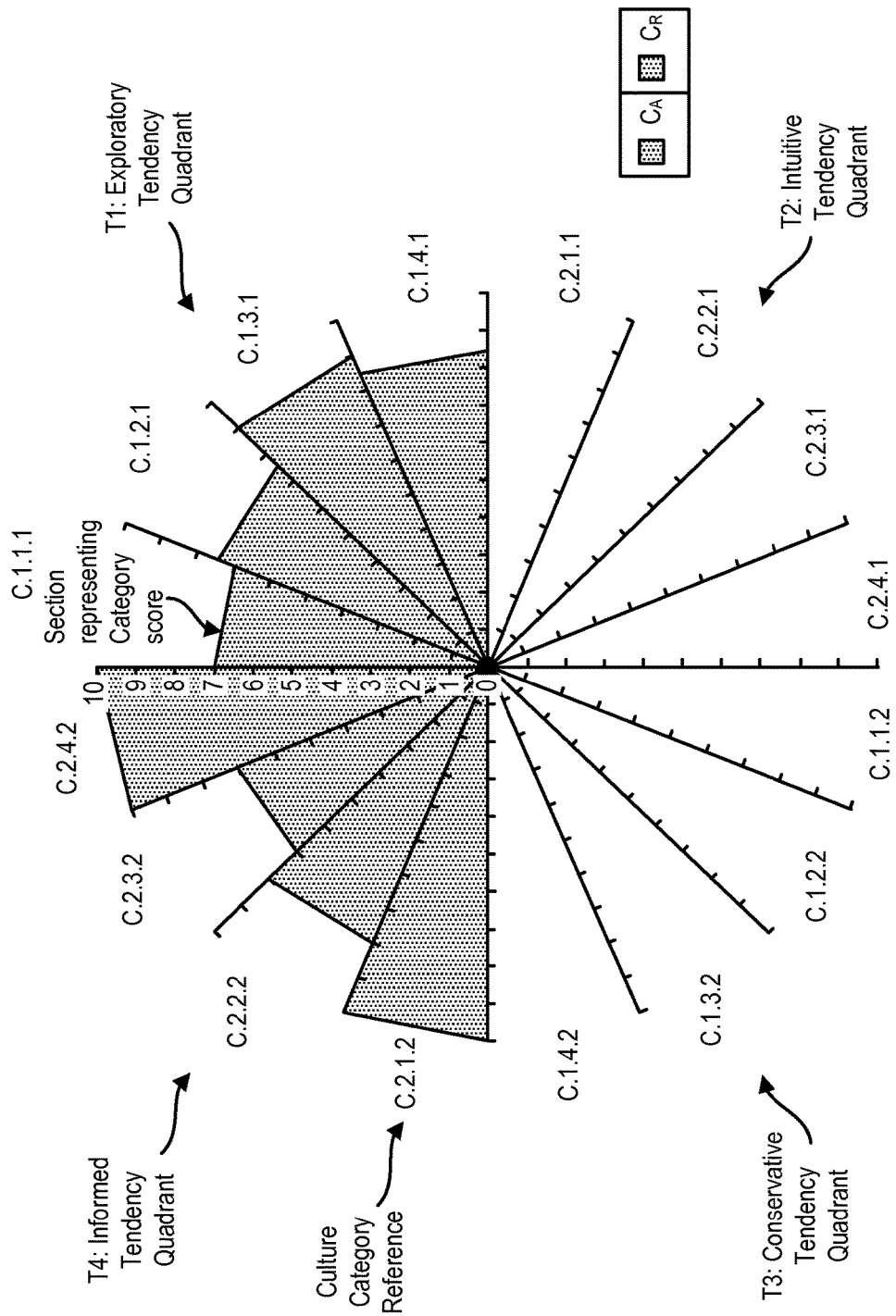
FIG. 16 illustrates that connected points create a plot relative to the FIG. 9 quadrants.

FIG. 16 illustrates that connected points create a plot relative to the FIG. 10 quadrants.

In one embodiment, and as a non-limiting example, scoring data by cultural tendency 20 is achieved with a linear measure for each attribute category 15. As a non-limiting example, the linear measure is a binary ruler 37 that scores cultural attributes 16 in relationship to two sub-attributes 16. In one embodiment, the scale scores position data along the binary ruler 37 in relationship to two sub-attributes 16.

In one embodiment, the map engine 24 creates a graphic output 26. In one embodiment, the graphic output 26 can be mapped on a Cartesian grid.

As a non-limiting example, a graphing method can be utilized that includes: (a) receiving a first value and a second value, and reference information corresponding to the first and second values; (b) determining an angle value using the first value and the second value, step (b) including (b-1) calculating a relational value by determining the quotient of a numerator and a denominator, in which the denominator is a function of the first value and the numerator is a function of at least the second value, and (b-2) obtaining the angle value by inputting the relational value in a predetermined inverse trigonometric function; (c) generating a graph having presented thereon a coordinate value formed using the angle value and the reference information; and (d) outputting the graph 26 to a display medium for display thereon, as set forth in U.S. Pat. No. 8,508,531, fully incorporated herein by reference.

As a non-limiting example, a graphical display of relationships can provide displays in which the locations of nodes of a graph relative to each other are a function of the significance of a relationship between the nodes. The technique used to locate the nodes produces groups of nodes with significant relationships to each other which are set visually apart from the other nodes. The relationships between the nodes are defined by using a statistic to give weights to links between the nodes. Statistics may also be used to determine the size, shape, and color of the nodes and the color and width of the links. The display may also include histograms which show the numbers of links or nodes which have given values of the statistics and which relate the colors in which the nodes and links are displayed to values of the statistics. The histograms may further be used to interactively define masks for links and nodes, and masked links and nodes are not taken into account in making the display, as set forth in U.S. Pat. No. 5,596,703, fully incorporated herein by reference.

In one embodiment, the map engine 24 creates a cultural tendency map with a quadrant assigned for each cultural tendency 20, FIGS. 9, 10 and 11. In one embodiment, the map engine 24 divides each of the quadrants into an incremental grid with X and Y reference points, FIG. 9. The map engine 24 can divide the incremental grid into decimal values between reference points. In one embodiment, the map engine 24 represents binary scores 18 of cultural attributes 16 using a radial measure. In one embodiment, the radial measure, with a measurable radius (r), is mapped to the graphic output 26.

In one embodiment, the map engine 24 sets a mid-point of the binary scale at a 0 point, where (r=0).

In one embodiment, illustrated in FIG. 11, values farther from the mid-point represent a closer match to the cultural tendency 20 shown in the quadrant than values closer to the mid-point. In one embodiment, a center point of a circle is established at the intersection of the X and Y axes, where X and Y are both equal to 0. In one embodiment, a center point of a graphic output 26 is established at the intersection of X and Y axes, where X and Y are both equal to 0.

In one embodiment, the grid is defined by the same scale as the binary ruler 37, FIG. 12. As a non-limiting example, the scale can be defined according to the range: x=0, y=10; x=0, y=−10; x=−10, y=0; and x=10, y=0.

In one embodiment, the radius (r) can be any integer or decimal value on the binary scale, FIG. 12. As a non-limiting example, a radius (r) value can be between 0 and 10 or 0 and −10. As another non-limiting example, a radius (r) value can be between 0 and 20 and 0 and −5.

In one embodiment, the map engine 24 transposes each cultural attribute binary score 18 to the graphic output 26.

In one embodiment, the graphic output 26 for each cultural attribute 16 is a wedge shape defined by a radius (r), an angle $\theta$, and a rotational position on a 360 degree reference.

In one embodiment, the graphic output 26 for each cultural attribute 16 is a circle section shape defined by a radius (r), an angle $\theta$, and a rotational position on a 360 degree reference.

In one embodiment, the graphic output 26 for each cultural attribute 16 is a bar shape defined by a length (r) and a width (w).

In one embodiment, the map engine 24 uses a grid location algorithm to map the graphic output 26.

In one embodiment, the graphic location algorithm relates a rotational position given as a number of degrees to a 360 degree reference, FIG. 13. The rotational position is given as a number of degrees in reference to 360 degrees and be described in terms of an angle $\theta$, where $\theta$ is between 0 and 360 degrees (including 0 and 360 degrees). The angle $\theta$ depends on the number of cultural attributes 16 being mapped to the graphic output 26. In one embodiment, if there is a whole number N of cultural attributes 16 mapped to the graphic output 26, $\theta$ is defined according to N as $\theta=360/2N$.

In one embodiment, the angle $\theta$ can be equal for each cultural attribute 16 being mapped or can be weighted according to attribute 16 priority.

As a non-limiting example, one suitable graphic location algorithm is a radial location algorithm that describes the location of a given cultural category mapped representation within a quadrant. Location can be described in either polar or Cartesian coordinates for radial mapping. Location can be described in units of either degrees or radians.

Location is described based on the number N of cultural categories being mapped, where there are C.1.N sections in the corresponding tendency quadrant and where N can vary between 1 and some number n for each tendency quadrant.

The number of radial degrees associated with each culture category N being mapped can be represented by $\theta$, where $\theta=360/(2N)$.

Quadrant 1:
(N−1)θ to Nθ
i.e. for N=1, the section will be from 0 to 0 degrees; for N=2, the section will be from θ to 2θ degrees.
Quadrant 2:
90+(N−1)0 to 90+Nθ
Quadrant 3:
180+(N−1)0 to 180+Nθ
Quadrant 4:
270+(N−1)0 to 270+Nθ

Another non-limiting example of a suitable grid location algorithm would be the same location algorithms as above, translated to radians instead of degrees.

In one embodiment, the rotational position can be dependent on how exclusively the cultural attribute 16 being mapped represents the cultural tendency 20 in a quadrant. In one embodiment, the cultural attributes 16 that are indicative of a single cultural tendency 20 are placed at a rotational position in the quadrant that does not border or share an X or Y axis. In one embodiment, cultural attributes 16 that are indicative of multiple cultural tendencies 20, shared or non-exclusive, are placed at a rotational position in the quadrant bordering or sharing an X or Y axis.

The map engine 24 displays the graphic output 26 produced to a display medium. The display medium can include a computer display, a mobile device display, or a printed output from a computer. The graphic output 26 produced by the mapping engine is sent to the comparison engine 28. In one embodiment, the mapping engine sends both cultural attribute binary scores 18 and map engine 24 graphic output 26.

In one embodiment, the comparison engine 28 assigns cultural attribute 16 data calculated values of radius and rotational position. The calculated values of radius and rotational position can be mapped as plotted points. In one embodiment, radial section allocations derived via the radial grid location algorithm designated by the angle θ can be equal or can be weighted according to organization priorities.

In one embodiment, the comparison engine 28 assigns calculated values of radius and rotational position for each cultural attribute 16 data score 22 being mapped. A priority can be assigned to cultural attribute 16 data. In one embodiment, the priority values can be values from survey data. In one embodiment, the priority values can be assigned by an analyst. The comparison engine 28 can calculate or re-calculate values of radius and rotational position for each cultural attribute data score 22 being mapped based on priority values.

In one embodiment, the comparison engine 28 performs the calculation of cultural priority among cultural attribute 16 data using a scalar weighting. Calculation of cultural priority can affect both the radius (r) and the rotational measures. In one embodiment, the scalar weighting can be used to scale (increase) radius (r) values according to the priority value. In one embodiment, the scalar weighting can be used to scale (increase) rotational allocations dictated by the angle θ according to the priority value. In one embodiment, the scalar weighting could be applied by multiplying a binary score 18 for a cultural attribute 16 with the assigned priority value. In one embodiment, the scalar weighting could be applied by multiplying the angle measure θ with the assigned priority value. In one embodiment, the calculation of cultural priority among cultural attribute 16 data using a scalar weighting to scale (increase) radial section area values according to the priority value.

The comparison engine 28 calculates allocation areas using the graphic output 26 and radial measure (r).

As a non-limiting example, for a given radius (r) and angle θ the area associated with the corresponding cultural attribute 16 being mapped is displayed as a wedge shape and has an area that can be expressed as area $$A = \frac{1}{2}r^2 \sin\frac{\theta}{2} \cos\frac{\theta}{2}.$$

As a non-limiting example, for a given radius (r) and angle θ the area associated with the corresponding cultural attribute 16 being mapped is displayed as a circle section shape and has an area that can be expressed as area $$A = \frac{1}{2}r^2\theta.$$

As a non-limiting example, for a given radius (r) the area associated with the corresponding cultural attribute 16 being mapped is displayed as a bar and has an area that can be expressed as area A=rw, where w is the selected width value of the attribute 16 being mapped. In this example, each cultural attribute 16 is displayed as a bar and the map engine 24 output is a spider diagram.

In one embodiment, quantification of area by quadrant is calculated to assign a value to the cultural tendency 20.

In one embodiment, calculating a measure of area assigns a value to the priority for a given cultural tendency 20.

In one embodiment, a measure of area is determined to assign relative values to the organization priorities.

The comparison engine 34 can perform a comparison of one culture to another culture. As a non-limiting example, the comparison engine 34 identifies other cultures for comparison ($C_B$) for comparison to a reference culture ($C_A$).

As a non-limiting example, the analytic engine quantifies the data quality score 22 for $C_A$ and $C_B$ data.

As a non-limiting example, the comparison engine 34 quantifies a difference of a total cultural attribute 16 data score 22 for $C_A$ and $C_B$. As a non-limiting example, the quantified difference can be expressed as a coefficient, a magnitude difference, or a percentage.

In one embodiment, the comparison engine 34 plots cultural tendencies 20 of $C_A$ and $C_B$ as a graphic output 26.

In one embodiment, the comparison engine 34 performs a comparison to a comparison variable ($C_V$). In one embodiment, the comparison engine 34 identifies a cultural comparison variable ($C_V$).

As a non-limiting example, the comparison variable $C_V$ can relate to different points in time, that include: (a) a previous time, (where −t=an interval before a current date), (b) a current time (where t=a collection date), (c) a future date (where +t=an interval after the current date). In one embodiment, the comparison variable $C_V$ can relate to an alternate schedule, where an interval to achieve an outcome is increased (+$t_i$) or decreased (−$t_i$). In one embodiment the comparison variable $C_V$ can relate to an outcome, which is a quantity associated with a measurable result or outcome state, and the outcome is an increase (+qty) or decrease (−qty).

In one embodiment, the comparison variable $C_V$ can relate to a financial state, which is (a) a value associated with an amount of financial increase (+$) or decreased (−$), (b) a total cost of ownership ($tco), (c) cost avoidance ($ca) or (d) a revenue impact ($ri).

In one embodiment, the comparison engine 34 can perform a repeat cultural attribute 16 data collection for another variable.

In one embodiment, the comparison engine 34 identifies a reference culture for evaluation ($C_R$).

In one embodiment, the reference culture $C_R$ is compared to the reference culture $C_A$ under a modification scenario where $C_A$ is considered modified by some selected variable $C_V$, represented by the culture $C_{AV}$.

In one embodiment, if the cultural attribute 16 information collection protocol is different for any of $C_{AV}$ or $C_R$ the data qualification engine calculates a modified data quality coefficient to represent the change in protocol.

In one embodiment, cultural tendencies 20 of $C_R$ and $C_{AV}$ are plotted as a graphic output 26.

In one embodiment, organization priorities of $C_R$ and $C_{AV}$ are plotted on a radial grid map, FIG. 10. The graphic output 26 process for each cultural variable included in $C_R$ and $C_{AV}$ can be repeated.

In one embodiment, for any cultural variables compared a measurable difference is used for comparison. As a non-limiting example, the other cultural variables can be two or more of: $C_A$, $C_B$, $C_R$, $C_V$, or $C_{AV}$.

In one embodiment, a difference is calculated for each of any $C_A$, $C_B$, $C_R$, $C_V$, or $C_{AV}$ being compared as change (delta) in area in each of the cultural tendency quadrants.

In one embodiment, a difference is calculated for each $C_A$, $C_B$, $C_R$, $C_V$, or $C_{AV}$ being compared as a quantified difference in each of the cultural tendency quadrants.

In one embodiment, a difference is calculated for each of $C_A$, $C_B$, $C_R$, $C_V$, or $C_{AV}$ as a quantified difference to assign relative values to the cultural tendencies 20.

In one embodiment, a difference is calculated for $C_A$, $C_B$, $C_R$, $C_V$, or $C_{AV}$ as a quantified difference of area for a given cultural attribute 16.

In one embodiment, a difference is calculated for $C_A$, $C_B$, $C_R$, $C_V$, or $C_{AV}$ as a quantified difference in length of radius (r) to assign a value to a priority of a cultural tendency 20.

In one embodiment, a difference is calculated for $C_A$, $C_B$, $C_R$, or $C_V$ for a quantified difference in measure or area to assign relative values to the organization priorities.

The comparison engine 34 can output results to a computer display, a mobile device display, to a multidimensional digital platform for storage or additional comparisons, or to another engine. Comparison engine 34 outputs can include graphic outputs 26, mapped outputs, and measurable differences expressed as a coefficient, a magnitude difference, or a percentage.

As a non-limiting example, the comparison engine 34 can provide a comparative visual assessment system including an input device, an output device and a computer system. The comparison engine 34 can include assigning a plurality of weights to a corresponding plurality of components representing a subject, assigning a plurality of scores 22 to the corresponding plurality of components representing the subject, determining a functional score for each of the plurality of components, determining an angle to be used for an output to the output device of a vector for each of the plurality of components, assigning the functional score to a length of the vector for each of the plurality of components, and displaying the vector on the output device, as set forth in U.S. Pat. No. 6,008,817, fully incorporated herein by reference.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A method for quantification and mapping of cultural characteristics comprising:
   providing a plurality of fixed physical assets;
   providing a plurality of servers coupled to the plurality of fixed physical assets;
   a data management system coupled to the plurality of fixed physical assets, the data management system including an extract transform load (ETL) that includes a fixed physical asset data analysis validator that determines if data from the plurality of fixed physical assets meets value thresholds, if yes the data is sent to a data warehouse of the data management system, an adaptive platform that includes one or more analytic engines for at least a portion of the plurality of fixed physical assets, and a report builder coupled to the plurality fixed physical assets, the data warehouse coupled to the plurality of servers and at least a portion of the plurality of fixed physical assets, the data management system configured to classify the plurality of fixed physical assets and their attributes relative to time and value, the data management system performing analysis of the plurality of fixed physical assets with increasing dimensionality and increasing or decreasing scale, with first, second and third order analysis performed at different scales where scale is a the level of detail of the particular analysis;
   using one or more analytic engines coupled to the plurality of servers and the plurality of fixed physical assets and provide multi-dimensional analysis relative to the plurality of fixed physical assets, where multi-dimensional analysis is defined as analysis that compares, calculates and performs a correlation on the plurality of fixed physical assets and their attributes from at least two distinct dimensions, where the time and value are used to understand how the plurality of fixed physical assets change over time;
   using the multi-dimensional analysis to predict outcomes and make changes for a renovation of at least a portion of the plurality of fixed physical assets;
   providing a scenario builder that uses prioritizations from a priorities builder and defined relationships between one or more user-prioritized lenses and incoming data to determine possible short-term and long-term responses to at least one of client facilities and operations of the physical assets, using multi-dimensional analysis to make predictions with outcomes and make changes to at least a portion of the physical assets, where the multi-dimensional analysis is defined as analysis that compares, calculates and performs a correlation on at least a portion of the plurality of physical assets and their attributes from at least two distinct dimensions, where a time and value are used to understand how the plurality of physical assets change over time;

receiving cultural attribute information by category and scoring the cultural attribute data for each cultural attribute to create scored data using a cultural score engine coupled to the analytic engine;

receiving the scored data and mapping data to a graphic output and executed with a map engine;

comparing a plurality of graphic outputs into a single comparison graphic output of cultural tendencies with a comparison engine;

wherein a comparison graphic output predicts outcomes and make changes for a renovation of at least a portion of a plurality of fixed physical assets, where short-term responses are developed by a recurring response developer and a long-range response developer predicts outcomes based on changes to at least a portion of the physical assets.

2. The method of claim 1, further comprising:
assigning data by category, with the assignment of data by category executed by the analytic engine and category selected by at least one of, an attribute, by binary and by cultural tendencies.

3. The method of claim 1, wherein each attribute includes a selection of sub-attributes selected from at least one of, diversity, social structure, environmental wellness, human wellness, management, financial, decision method and technology adeptness.

4. The method of claim 1, further comprising:
giving each attribute a corresponding binary ruler with opposing tendencies for each attribute when binary score is used.

5. The method of claim 1, further comprising: scoring each attribute on a scale when binary score is used.

6. The method of claim 5, wherein the scale can be set from −10 to 10.

7. The method of claim 5, further comprising: ability of scale to measure decimal increments.

8. The method of claim 7, wherein the score on a scale of −10 to 10 can be 7.2.

9. The method of claim 1, wherein cultural tendencies include at least one of: conservative, exploratory, informed, intuitive.

10. The method of claim 1, further comprising:
using a linear measure for each cultural attribute category to score data by cultural tendency.

11. The method of claim 10, further comprising: scoring cultural attributes in relationship to two sub-attributes.

12. The method of claim 1, further comprising:
performing a calculation of priority for cultural attribute data using the assessment engine.

13. The method of claim 12, further comprising:
performing a calculation of cultural priority among cultural attribute data using a quantitative valuation algorithm.

14. The method of 12, wherein the calculation of cultural priority affects both the radius (r) and the rotational measures.

15. The method of claim 1, further comprising: using a measurable difference for any cultural variables compared.

16. The method of claim 15, wherein the other cultural variables can be two or more of: CA, Cs, CR, Cv, or Cav.

17. The method of claim 16, further comprising:
calculating a difference for each of for each of any CA, Cs, CR, Cv, or CAv being compared as change (delta) in area in each of the cultural tendency quadrants.

18. The method of claim 16, further comprising:
calculating a difference for each CA, Cs, CR, Cv, or CAv being compared as a percent change in area in each of the cultural tendency quadrants.

19. The method of claim 16, further comprising:
calculating a difference for each of CA, Cs, CR, Cv, or CAv as a percent of area to assign relative values to the cultural tendencies.

20. The method of claim 16, further comprising:
calculating a difference for CA, Cs, CR, Cv, or CAv as a percent of area of radius (r) to assign a value to a priority of a cultural tendency.

21. The method of claim 16, further comprising:
calculating a difference for CA, Cs, CR, or Cv for a percent of area to assign relative values to the organization priorities.

* * * * *